Patented July 12, 1938

2,123,834

UNITED STATES PATENT OFFICE 2,123,834

OXAZOLE DYESTUFFS OF THE ANTHRA-QUINONE SERIES AND A PROCESS OF PREPARING THEM

Georg Kränzlein, Hans Schlichenmaier, and Ludwig Wilhelm Berlin, Frankfort-on-the-Main, Germany, assignors to General Aniline Works, Inc., New York, N. Y., a corporation of Delaware No Drawing. Application March 21, 1935, Serial No. 12,300. In Germany March 24, 1934

6 Claims. (Cl. 260—44)

The present invention relates to oxazole-dyestuffs of the anthraquinone series and to a process of preparing them.

We have found that oxazole-dyestuffs may be obtained by heating a 1-hydroxy-2.4-diaminoanthraquinone with an aromatic carboxylic acid chloride, preferably in the presence of a high boiling diluent and advantageously in the presence of an acid condensing agent, and, if desired, exchanging in known manner the acyl group, bound at the nitrogen of the condensation product obtained, for another acyl group.

By using for the preparation of the dyestuffs 1 mol. of a 1-hydroxy-2.4-diaminoanthraquinone and 2 mols of an acid chloride, the reactions perhaps take the following course:

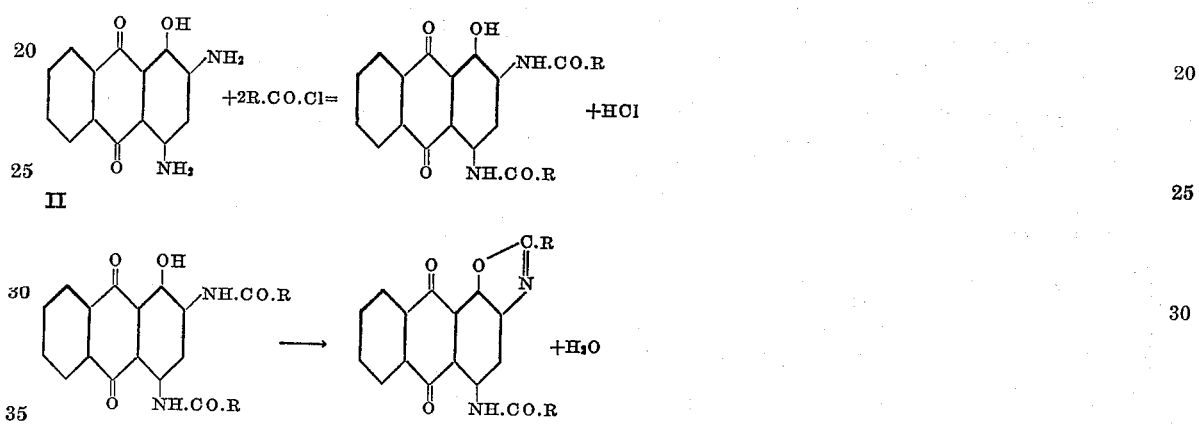

At first acylation of both amino groups occurs and in the second phase of the reaction the formation of the oxazole-ring takes place with elimination of 1 mol. of water.

The two phases may be performed separately or may be combined in one single operation.

In the first case, the 1-hydroxy-2.4-diaminoanthraquinones are heated in a high boiling solvent such as, for instance, nitrobenzene, with at least 2 mols of an acid chloride until hydrochloric acid no longer escapes; the whole is then allowed to cool and the 1-hydroxy-2.4-diacyldiaminoanthraquinones formed, are filtered with suction. In the dry state these compounds form well defined red-brown crystals which dissolve in concentrated sulfuric acid to a characteristic blue-red solution. The 1-hydroxy-2.4-diacyldiaminoanthraquinones are then heated to boiling in a suitable diluent, for instance, chloronaphthalene, preferably in the presence of an acid condensing agent such as, for instance, zinc chloride or an organic sulfonic acid such as para-toluene sulfonic acid or naphthalene-1.5-disulfonic acid, until the color of the solution which is at first red-yellow has turned yellow and a test portion of the condensation product no longer dissolves in concentrated sulfuric acid to a blue-red but to a red-yellow solution. The whole is then allowed to cool, the dyestuffs which have separated in a crystalline form, are filtered with suction, washed with a small quantity of chloro-naphthalene and dried. The reaction products are well defined yellow to yellow-brown crystals which dissolve in concentrated sulfuric acid to a red-yellow solution.

A simpler method of working consists in heating the 1-hydroxy-2.4-diaminoanthraquinones, for instance, in chloronaphthalene with at least 2 mols of an acid chloride in the presence of an acid condensing agent, such as, for instance, para-toluene-sulfonic acid or napththalene-1.5-disulfonic acid until a test portion of the reaction products formed dissolve in concentrated sulfuric acid to a red-yellow solution.

By using, however, at least 3 mols of an acid chloride, for instance, benzoyl-chloride, and 1 mol. of a 1-hydroxy-2.4-diaminoanthraquinone, there is apparently formed a tribenzoyl-compound and in this case the closure to the oxazole-ring takes place with elimination of benzoic acid. Very often this condensation occurs more easily and yields purer products than in case 2 mols of an acid chloride are caused to react with 1 mol. of 1-hydroxy-2.4-diamino-anthra-quinone.

There are thus obtained with a very good yield pure crystalline compounds. The oxazole-compounds dye cotton from a red to blue-red vat black-brown tints which, when exposed to the action of air, turn yellow of vivid intense shades of good fastness properties, especially of a good fastness to light.

By saponifying in known manner the dyestuffs of the Formula II there are obtained compounds of the general formula:

III
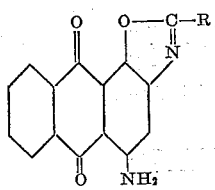

These compounds are as such red to blue-red vat-dyestuffs which may be converted according to known methods by reaction with acid chlorides into new vat-dyestuffs of the formula:

IV
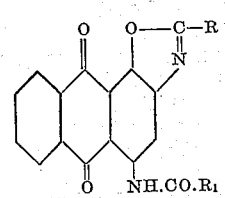

wherein R and $R_1$ represent any aryl radicals. In this manner compounds may be prepared wherein the radicals R and $R_1$ are the same or different.

The present invention offers a large number of possible combinations for the manufacture of dyestuffs having very valuable technical properties.

An oxazole which perhaps corresponds with Formula III, wherein R represents the radical $C_6H_5$ may be prepared according to Example 2 of German Patent No. 252,839, by condensing 1-hydroxy-2.4-diaminoanthraquinone with benzaldehyde. The yield, however, amounts to at most 20% and the product is obtained in a very impure state. It melts, in spite of repeated re-crystallization, at about 14° C. below the melting point of the corresponding product obtainable according to the present process, it is dirty yellow-brown instead of pure red and dyes cotton orange instead of pink tints. The dyestuff which may be obtained by reacting the aforesaid known dyestuff with benzoyl chloride and which perhaps corresponds with Formula II, dyes cotton redder and more turbid tints than the dyestuff which is obtainable in one operation directly in a pure state and with a very good yield by reaction of 1-hydroxy-2.4-diaminoanthraquinone with benzoyl-chloride. When trying to apply the process of the aforesaid patent to, for instance, substituted benzaldehydes, it has been found that in some cases the process did not work at all, and in other cases the yields were even worse than in case of simple benzaldehyde.

The present process, however, yields good results also when substituted acid chlorides are used. Due to its general application and the fact that it produces purer dyestuffs with a much better yield the present process constitutes a considerable technical advance over the known process.

According to the present process a great number of new dyestuffs may be obtained, for instance, those of the following general formula:

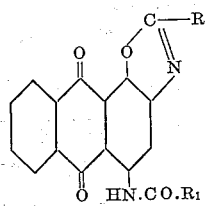

wherein R represents a phenyl group containing substituents or an aryl group of the naphthalene and anthraquinone series, and $R_1$ represents an aryl radical of the benzene, naphthalene and anthraquinone series.

If necessary the dyestuffs may be after-treated in known manner with a sodium hypochlorite solution in order to purify them.

The following examples serve to illustrate the invention, but they are not intended to limit it thereto, the parts being by weight:

(1) 12.5 parts of 1-hydroxy-2.4-diaminoanthraquinone are suspended in 100 parts of nitrobenzene and, after addition of 14 parts of benzoyl chloride, the whole is boiled in a reflux apparatus until hydrochloric acid gas no longer escapes. After cooling, the reaction product separates in the form of well crystallized brown-red needles. They are filtered with suction, washed with nitrobenzene and dried. They melt at 296° C. and dissolve in concentrated sulfuric acid to a blue-red solution; the yield amounts to about 19 parts.

23.1 parts of this product are heated to boiling in 100 parts of alpha-chloronaphthalene in the presence of 0.25 part of para-toluene-sulfonic acid until the color of the solution which is at first yellow-red has turned yellow and a test portion taken from the reaction product dissolves in concentrated sulfuric acid no longer to a blue-red but to a red-yellow solution. This is the case after about 1 to 2 hours, the whole is allowed to cool, the dyestuff which has separated in the form of yellow needles, is filtered with suction, washed with a small quantity of chloronaphthalene and nitrobenzene and dried. The dyestuff forms yellow needles which melt at 300° C. and dissolve in concentrated sulfuric acid to a red-yellow solution. The compound is very sparingly soluble in low boiling organic solvents such as benzene, chlorobenzene and alcohol and more easily soluble in high-boiling solvents such as nitrobenzene and chloronaphthalene. It yields a red vat and dyes cotton black-brown tints which, on exposure to the air, turn vivid greenish-yellow of good fastness properties, especially of a good fastness to light. The yield of dyestuff amounts to about 19 parts.

(2) 12.5 parts of 1-hydroxy-2.4-diaminoanthraquinone and 14 parts of benzoyl chloride are heated in 100 parts of alpha-chloronaphthalene in the presence of 0.5 part of para-toluene-sulfonic acid until the color of the solution has become yellow and a test portion taken from the reaction product dissolves in concentrated sulfuric acid to a red-yellow solution. This is the case after about 2 to 3 hours; the whole is then allowed to cool and the crystalline compound is filtered with suction. After drying it melts at 300° C. and is entirely identical with the product obtained according to Example 1. The yield amounts to about 20 parts.

(3) 25 parts of 1-hydroxy-2.4-diaminoanthraquinone are heated in 300 parts of nitrobenzene with 50 parts of para-toluyl acid chloride until hydrochloric acid gas no longer escapes. The reaction product which has separated in a crystalline form is washed with a small quantity of nitrobenzene, suspended in 400 parts of alpha-chloronaphthalene and the suspension is heated to boiling in the presence of 1 part of para-toluene-sulfonic acid until a test portion taken from the reaction product dissolves in concentrated sulfuric acid to a red-yellow solution. This is the case after about 1 hour; the whole is then allowed to cool, the crystalline reaction product is filtered with suction and dried. The dyestuff thus obtained forms yellow needles, melting at 304° C. It dyes cotton vivid yellow tints of good fastness properties. The yield amounts to about 30 parts.

(4) 25 parts of 1-hydroxy-2.4-diaminoanthraquinone are heated to boiling in 200 parts of nitrobenzene with 45 parts of para-chlorobenzoyl chloride until the evolution of hydrochloric acid gas has ceased. The crystalline red-brown intermediate which has separated is heated in 200 parts of alpha-chloro-naphthalene until a test portion dissolves in concentrated sulfuric acid to a red-yellow solution. The reaction product is worked up in the usual manner and forms brown-red crystals which melt at 332° C. and dye cotton fast yellow tints. The yield amounts to about 29 parts.

(5) 12.5 parts of 1-hydroxy-2.4-diaminoanthraquinone are heated in 200 parts of nitrobenzene with 25 parts of 2.4-dichlorobenzoylchloride until hydrochloric acid gas no longer escapes. The isolated brown-red crystalline intermediate which melts at 328° C. to 330° C. is heated in 150 parts of alpha-chloronaphthalene in the presence of 0.5 part of paratoluene sulfonic acid until a test portion of the reaction product dissolves in concentrated sulfuric acid to a yellow solution. The condensation product is isolated in the usual manner and forms yellow needles which melt at 312° C.

(6) The dyestuff which is obtainable according to Example 1 or 2 is saponified by shortly warming it with sulfuric acid of about 95 percent strength, poured on ice, dried and recrystallized from nitrobenzene; intense red needles which melt at 318° C. are obtained. They dissolve in concentrated sulfuric acid to a Bordeaux solution and dye cotton from a red vat pink tints.

2 parts of the free amine are added to 50 parts of nitrobenzene and heated to boiling for a short time with 2 parts of para-toluyl acid chloride. After cooling, the new dyestuff separates in the form of well crystallized yellow needles which dye cotton vivid fast yellow tints.

By using instead of para-toluyl acid chloride, 2.4-dichlorobenzoylchloride for the acylation of the amine, a dyestuff is obtained with a very good yield which dyes cotton greenish-yellow tints.

By using instead of para-toluyl acid chloride, 3-chloro-anthraquinone-2-carboxylic acid chloride, a similarly good dyestuff is obtained dyeing cotton clear greenish-yellow tints of good fastness to light.

(7) By saponifying in a manner analogous to that of Example 6 the dyestuff which is obtainable according to Example 3 by condensing 1-hydroxy-2.4-diaminoanthraquinone with para-toluyl acid chloride, an amine is obtained which crystallizes from nitrobenzene in the form of well defined carmine-red needles. They dissolve in concentrated sulfuric acid to a yellow solution and decompose at 317° C. By treating this amine with benzoyl chloride or para-chlorobenzoylchloride or dichlorobenzoylchloride in the presence of pyridine which acts as an acid binding agent, there are obtained dyestuffs which dye cotton reddish-yellow tints of good fastness properties. By reacting the amine with 3-chloroanthraquinone-2-carboxylic acid chloride a dyestuff is obtained which dyes cotton greenish-yellow tints.

(8) By saponifying the dyestuffs which are obtainable according to Examples 4 and 5, there are obtained the corresponding free amines in the form of intense red crystalline compounds, melting at 336° C. and 314° C., respectively. The amines dissolve in concentrated sulfuric acid to a yellow or green-yellow solution, respectively.

3 parts of the amine which melts at 336° C. are boiled with 4 parts of 1-chloroanthraquinone-2-carboxylic acid chloride and a small quantity of pyridine until the color of the solution has become pure yellow. The new dyestuff separates even at boiling temperature in the form of yolk of egg colored crystalline precipitate. The latter is filtered with suction and dried. It yields very easily a yellow-red vat and dyes cotton, after exposure to air, greenish-yellow tints.

By using instead of 1-chloroanthraquinone-2-carboxylic acid chloride, 2.4-dichlorobenzoyl chloride a dyestuff is obtained which dyes cotton yellow tints which are fast to light.

By using benzoylchloride, another valuable dyestuff is obtained which forms yellow crystals, melting at 312° C., and dissolving in concentrated sulfuric acid to a yellow-red solution.

(9) 12.5 parts of 1-hydroxy-2.4-diaminoanthraquinone are boiled in 200 parts of chloronaphthalene with 30 parts of diphenyl-4-carboxylic acid chloride in the presence of 1 part of para-toluene sulfonic acid until a test portion dissolves in concentrated sulfuric acid to a yellow-red solution. This is the case after about 1 hour; the whole is then allowed to cool and the dyestuff formed is filtered with suction. It represents yellow crystals which melt at 362° C. to 364° C. and dissolve in concentrated sulfuric acid to a yellow solution. The yield of dyestuff is good.

(10) 25 parts of 1-hydroxy-2.4-diaminoanthraquinone are heated to boiling in 300 parts of alpha-chloronaphthalene with 38 parts of beta-naphthoyl chloride in the presence of 1 part of para-toluene sulfonic acid until a test portion dissolves in concentrated sulfuric acid to a yellow-red solution. The whole is then allowed to cool and the dyestuff formed is filtered with suction; it constitutes red-brown crystals which melt at 311° C. to 312° C. By saponifying the acylamino group of the dyestuff a compound is obtained which after re-crystallization from nitrobenzene represents dark red needles which melt at 337° C. to 338° C.

(11) 25 parts of 1-hydroxy-2.4-diaminoanthraquinone are heated to boiling in 300 parts of nitrobenzene for about 3 to 4 hours, with 42 parts of benzoyl chloride in the presence of 1 part of para-toluene sulfonic acid until a test portion dissolves in concentrated sulfuric acid to a yellow-red solution. The dyestuff is worked up as described above. It is identical with that obtainable according to Example 1 or 2. The yield amounts to 36 parts. The dyestuff may be further treated according to the process of Example 6.

(12) 12.5 parts of 1-hydroxy-2.4-diaminoanthraquinone and 33 parts of 1-chloro-6-anthraquinone carboxylic acid chloride are heated to boiling in 250 parts of alpha-chloronaphthalene for about 1 hour in the presence of ½ part of para-toluene sulfonic acid, until hydrochloric acid gas no longer evolves. An orange-red body separates which, after cooling, is filtered with suction and may be recrystallized from 1500 parts of alpha-chloronaphthalene. There is obtained with a nearly quantitative yield a dyestuff in the form of an orange-yellow powder which melts above 340° C. and yields a brown vat from which cotton is dyed yellow tints.

(13) 10 parts of the 4-anthraquinonyloxazole, obtainable according to Example 12, are heated in 150 parts of concentrated sulfuric acid for 1 hour at 90° C. to 95° C. After cooling, the solution is poured into ice-water and, after isolation of the product and recrystallization from alpha-chloronaphthalene, 8 parts of the corresponding 4-amino-oxazole are obtained in the form of a red powder, melting at 298° C. This amine is heated to boiling in 50 parts of nitrobenzene with 3.5 parts of meta-toluyl acid chloride until hydrochloric acid no longer escapes. The whole is filtered and, after cooling and isolation from the mother liquor, a yellow product is obtained which melts at 347° C. It dyes cotton from a red-brown clear vat greenish-yellow tints.

We claim:

1. The process of making an oxazole dyestuff of the anthraquinone series which comprises boiling for about 3 to 4 hours in the presence of nitrobenzene and some para-toluene sulfonic acid, 1 mol. of 1-hydroxy-2.4-diamino-anthraquinone with about 3 mols of benzoyl-chloride until the solution has assumed a yellow coloration.

2. The process of making an oxazole dyestuff of the anthraquinone series which comprises boiling for about 3 to 4 hours in the presence of nitrobenzene and some para-toluene-sulfonic acid, 1 mol. of 1-hydroxy-2.4-diamino-anthraquinone with about 3 mols of benzoyl-chloride until the solution has assumed a yellow coloration and replacing the C₆H₅CO-group bound at the nitrogen in 4-position of the product obtained by the 3-chloro-anthraquinone-2-CO-group according to known methods.

3. The compound of the formula:

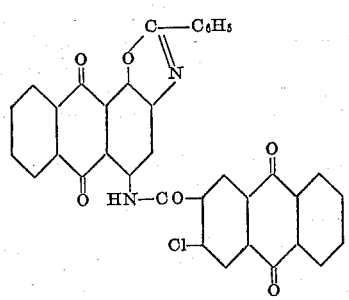

which dyes cotton clear greenish-yellow tints of good fastness to light.

4. The compounds of the general formula:

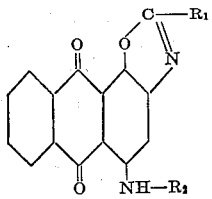

wherein R₁ means a member of the group consisting of radicals of the formulae:

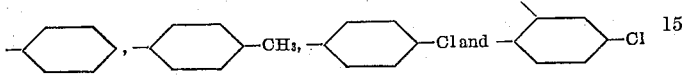

and R₂ means a member of the group consisting of radicals of the formulae:

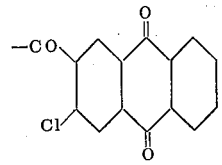

and

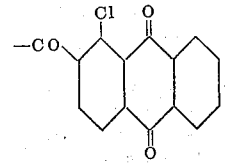

5. The compound of the formula:

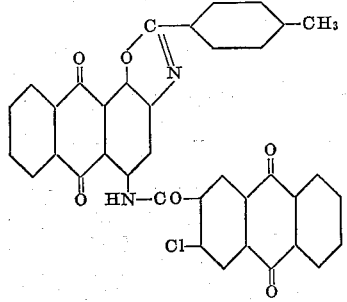

which dyes cotton clear greenish-yellow tints of good fastness to light.

6. The compound of the formula:

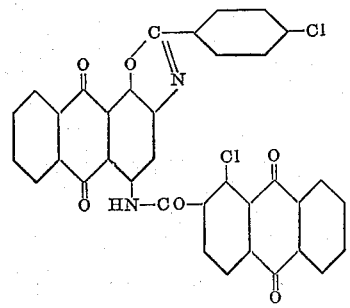

which dyes cotton clear greenish-yellow tints of good fastness to light.

GEORG KRÄNZLEIN.
HANS SCHLICHENMAIER.
LUDWIG WILHELM BERLIN.